Dec. 12, 1944.  A. D. EPLETT  2,364,700
SAFETY VALVE
Filed Aug. 21, 1943
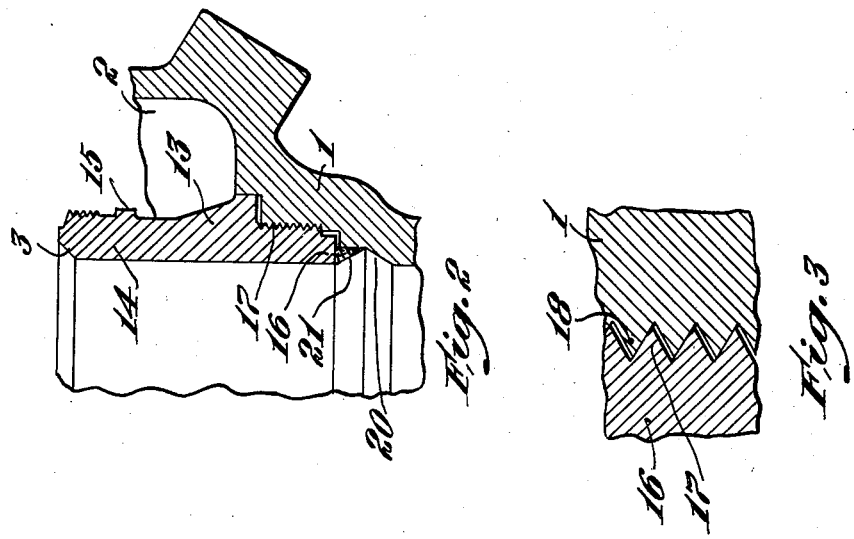
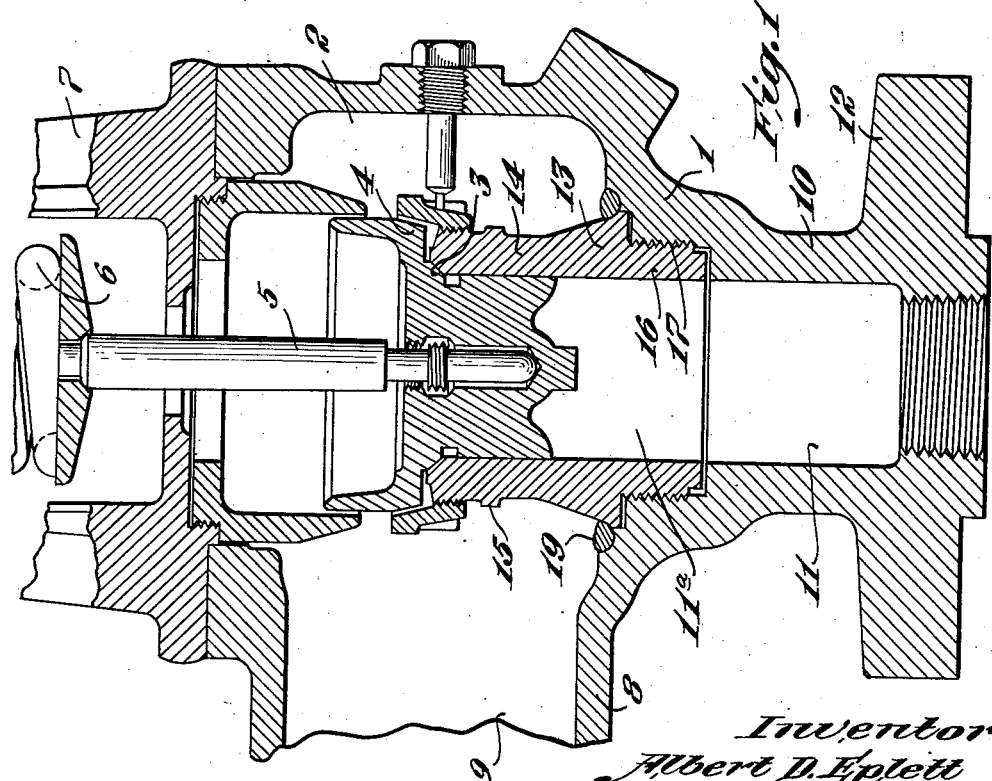
Inventor
Albert D. Eplett
by Roberts Cushman & Woodberry
attys.

Patented Dec. 12, 1944

2,364,700

UNITED STATES PATENT OFFICE 2,364,700

SAFETY VALVE

Albert D. Eplett, Bridgeport, Conn., assignor to Manning, Maxwell & Moore, Incorporated, New York, N. Y., a corporation of New Jersey Application August 21, 1943, Serial No. 499,489

6 Claims. (Cl. 251—167)

This invention relates to safety valves such as are customarily used on steam boilers, oil stills or the like, in order automatically to relieve excess pressures, and relates more particularly to valves of the kind wherein the valve seat is formed at the upper end of a sleeve or bushing coaxial with the throat or inlet passage. The patent to Graesser et al., No. 1,668,453, dated May 1, 1928, is illustrative of such a valve and discloses in particular a seat supporting sleeve or bushing designed to minimize distortion effects.

Ordinarily such a safety valve includes a casing having a hollow body portion which houses the valve seat and the movable valve head or feather. The casing also includes a base comprising a tubular upstanding neck portion and a radial flange or its equivalent by means of which the valve casing is secured to the boiler or supply pipe. The casing also commonly includes a hollow laterally extending outlet arm provided at its outer end with means for connecting it to a delivery pipe leading to the atmosphere. The several parts of the casing including the body portion, the base, the seat bushing and the outlet arm have commonly been integrally formed of the same material, for example, low carbon steel. However, in the better types of valve, the seat bushing is a separate element, screw-threaded to the casing body or neck, and of a different (usually more wear-resistant) material from the other parts of the casing.

As described in the Graesser patent above referred to, it has heretofore been proposed to provide the seat bushing or sleeve with external reinforcing ribs or rings in order to reduce distortion of the parts by reason of temperature variations and other stress-inducing factors. Such a ribbed seat bushing has been found highly successful as a means for minimizing distortions when such seat bushing or sleeve has been made of bronze or nickel alloys having a coefficient of expansion, for instance 0.0000181″ per inch per degree C. between 20° and 200° C., which is substantially greater than that of the ordinary carbon steel casing whose coefficient of expansion may be of the order of 0.0000126″ per inch per degree C. between 20° and 200° C. Such bushings were ordinarily screw-threaded for engagement with screw threads in the neck of the casing and usually seated leak-tight against a flange or shoulder of the casing.

By reason of constantly increasing pressures and temperatures employed in engineering practice, it has been found desirable to make the seat bushings of a material even more resistant to wear than the previous bronze or nickel alloys, and among other things stainless steel has been used for the purpose—stainless steel suitable for the purpose having a coefficient of expansion of 0.0000105″ per inch per degree C. between 20° and 200° C. However, it has been found that when the bushing is made of stainless steel or other material having a coefficient of expansion not greatly different from that of the body of the casing, the valve soon develops leaks between the bushing and the casing body and this has proven so serious a matter that valves of this general type having stainless steel bushings are not acceptable for certain purposes.

Without making any other change in design, it was attempted to cure this defect by seal-welding the bushing to the valve body but it was found that this practice substantially neutralized any distortion minimizing effects resultant from the employment of the ribbed bushing and in general increased distortion to an extent making this practice valueless.

It has now been discovered that the distortion may be minimized and leakage completely eliminated, when employing a stainless steel or similar bushing, by using a loose threaded connection between the bushing and the body and avoiding seating the bushing firmly against the body of the casing when screwing it in place, and thereafter seal-welding the bushing, either at its upper or lower part, to the casing.

While the reason for this improved result is not definitely understood, it is believed that when a bushing is screw-threaded tightly into a casing body having a similar coefficient of expansion and seated firmly against the shoulder or the like of the body so that the threaded sections are under high stress, the parts are warped or distorted by the high heat of welding. On the other hand, when the bushing and body are only loosely threaded together and the bushing is not screwed down tight against a mechanical seat, the parts are not distorted by the heat of welding and thus are not so stressed as to cause separation and leaks when in service. Whether or not this is the correct explanation of the observed results, it has been discovered that this procedure makes it possible to provide casings of carbon steel with seat bushings of stainless steel or similar materials capable of withstanding extremely high temperatures and pressures without danger of leakage and with distortion effects reduced to a minimum. These and other objects and advantages of the invention will be pointed out more fully in the following detailed description and by reference to the accompanying drawing wherein:

Fig. 1 is a fragmentary diametrical section through the casing of a safety valve embodying the present invention;

Fig. 2 is a similar fragmentary view illustrating a modified construction; and

Fig. 3 is a fragmentary section, to larger scale, illustrating a structural detail.

Referring to the drawing, the numeral 1 designates the hollow body portion of the casing. This portion may be of any suitable material appropriate for the purpose, for example, carbon steel or a low alloy steel, and may be a casting or forging. The valve body has the interior chamber 2 within which is located the valve seat 3 and the movable valve head or feather 4. As illustrated, the valve head is furnished with the stem 5 which is engaged by a loading spring 6 housed within a bonnet 7 (partly shown). The casing has a lateral hollow arm or extension 8 providing the delivery passage 9, it being understood that the arm 8 may have provision, if desired, for securing thereto a delivery pipe leading to the outer atmosphere. The casing also comprises the tubular stem portion 10 having the axial bore 11, which forms the lower portion of the inlet passage or throat of the valve. The stem portion, as illustrated, is integral with a radial external attaching flange 12 by means of which the valve structure may be secured to a support, for example, to the shell of a boiler.

The seat bushing 14 is arranged within the lower part of the chamber 2, preferably so that the major part at least of the bushing is within the chamber 2. The bushing is tubular, having an axial bore 11ª which is aligned with and of substantially the same diameter as the inlet passage 11 in the neck portion 10 of the valve casing. The valve seat 3 is here shown as formed directly upon the upper surface of the bushing 14. As illustrated, the upper portion 14 of the bushing is provided with one or more external ribs 15 designed to minimize distortion of the bushing, all as more fully disclosed in the patent to Graesser et al., No. 1,668,453, above referred to. While this type of bushing is desirable, the present invention is not limited to bushings of that kind.

The lower portion 16 of the bushing is received in an annular recess just above the junction of the neck portion with the body portion of the valve casing. The part 16 of the bushing is externally threaded, as shown at 17 (Figs. 1 and 3) and engages the internally threaded wall of the recess which receives the part 16. As illustrated in Fig. 3, the interengaging screw threads 17 and 18 carried by the parts 16 and 1, respectively, are so formed as to provide a loose fitting connection, there being a very slight clearance between the threads (exaggerated as shown in Fig. 3) so that relative expansion aid contraction of the parts 1 and 16 is freely permitted, although these parts are mechanically united by the screw threads.

When assembling the bushing 13 with the casing, the bushing is screwed down into the recess in the casing, the threads 17 and 18 engaging, but the part 13 is not screwed down sufficiently far to seat solidly against any part of the casing. However, the threaded portions of the bushing and casing are of sufficient length to insure a proper alignment of the bushing with reference to the neck portion 10 of the casing during subsequent operations. After the bushing and casing have been assembled as just described, they are permanently united by an annulus of welding metal 19 disposed in a groove formed in adjacent portions of the bushing 13 and the body 1. This annulus 19 of welding metal is designed primarily to seal the joint between the parts against leakage. For this purpose the body of welding material may be quite small, being merely a seal-weld as contrasted with a mechanical weld of the kind which is designed to unite parts to resist substantial stress. In the present construction, engagement of the screw thread 17 with the threads 18 effectively resist forces tending to cause upward movement of the bushing relatively to the casing, the threaded connection thus having the double function of holding the parts in proper assembled relation during welding and of resisting mechanical stress tending to separate the parts. However, the weld at 19 is solely depended upon to resist leakage of pressure fluid between the parts 1 and 16.

While this construction is useful regardless of the materials which may be employed in making the casing and bushing, it is of particular value when the bushing 16 is to be made of a material such as stainless steel having a coefficient of expansion which is not substantially greater than that of the body 1. Assuming that the body 1 is a mild carbon steel and that the bushing is an alloy steel such as stainless steel, whose coefficient of expansion is not substantially greater than that of the body 1, it has been found, as above pointed out, that if the bushing is screwed into the body portion with a tight fitting thread and screwed up hard against a seat surface of the body portion, and the parts are then welded together, leakage soon develops, apparently due to the effects of the initial stresses imposed by screwing the bushing tightly into the body before subjecting the parts to the high temperature of welding. On the other hand, with the present construction, using the loose fitting screw thread connection, leakage does not develop in the welded structure even under extreme conditions of use.

While in Fig. 1 the bushing is shown welded to the body at the level of the floor of the chamber 2, it may be preferred to locate the weld at a different point, as illustrated for example in Fig. 2, wherein the parts are substantially identical with those above described except that the body and bushing are not shaped to provide an annular recess where they join at the level of the floor of the chamber 2, but the body is provided with an annular internal recess 20 at the upper end of the neck portion such that the lower end of the part 16 of the bushing overhangs the recess. An annular body of welding metal 21 is disposed in this recess 20 so as to fuse with the overhanging lower end of the part 16 of the bushing and with the inner wall of the recess 20 of the body portion.

While certain desirable embodiments of the invention are herein illustrated by way of example, it is to be understood that the invention is not limited to these precise arrangements but is to be regarded as broadly inclusive of all modifications and equivalents falling within the terms of the appended claims.

I claim:

1. A safety valve of the kind wherein the valve casing includes a hollow body portion which houses a seat-supporting bushing and which has means providing a union between the bushing and casing, characterized in that said union includes a loose screw-threaded connection between the bushing and casing and a seal-weld providing a permanent leak-tight joint between the bushing and casing.

2. A safety valve of the kind wherein the valve casing includes a hollow body portion which houses a seat-supporting bushing and which has means providing a union between the bushing and casing, characterized in that said union includes a loose screw-threaded connection between the bushing and casing and a seal-weld providing a permanent leak-tight union between the bushing and the body portion of the casing.

3. A safety valve of the kind wherein the valve casing includes a hollow body portion which houses a seat-supporting bushing, the casing also having a tubular neck portion provided with attaching means, the seat bushing being coaxial with the neck, and means providing a union between the bushing and casing, characterized in that said union includes a loose screw-threaded connection between the bushing and casing, and a seal-weld providing a permanent leak-tight joint between the lower end of the bushing and the neck portion of the casing.

4. A safety valve of the kind wherein the valve casing includes a hollow body portion which houses a seat-supporting bushing, and means providing a union between the bushing and casing, characterized in that the bushing is of a material whose coefficient of thermal expansion does not substantially exceed that of the material of the casing, and further characterized in that said union includes a loose screw-threaded connection between the bushing and casing, and a seal-weld providing a permanent leak-tight joint between the bushing and casing.

5. A safety valve of the kind wherein the valve casing includes a hollow body portion which houses a seat-supporting bushing and which has means providing a union between the bushing and casing, characterized in that the casing is of steel having a coefficient of thermal expansion of the order of 0.0000126 inch per degree C. between 20° and 200° C. and wherein the bushing is of stainless steel having a coefficient of thermal expansion of the order of 0.0000105 inch per degree C. between 20° and 200° C., and further characterized in that said union includes a loose screw-threaded connection between the bushing and casing, and a seal-weld providing a permanent leak-tight joint between the bushing and casing.

6. A safety valve of the kind wherein the valve casing includes a hollow body portion which houses a seat-supporting bushing and which has means providing a union between the bushing and casing, the upper portion of the bushing being free from contact with the casing and having an anti-distortion peripheral rib, characterized in that said union includes a loose screw-threaded connection between the lower part of the bushing and the casing, and a seal-weld providing a permanent leak-tight union between the bushing and casing.

ALBERT D. EPLETT.